United States Patent
O'Sullivan et al.

(10) Patent No.: US 9,424,559 B2
(45) Date of Patent: Aug. 23, 2016

(54) ANNOTATION OF COMMUNICATIONS

(75) Inventors: Patrick Joseph O'Sullivan, Ballsbridge (IE); Edith Helen Stern, Yorktown Heights, NY (US); Barry E. Willner, Briarcliff Manor, NY (US); Robert Cameron Weir, Westford, MA (US); Carol Sue Zimmet, Boxborough, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1216 days.

(21) Appl. No.: 12/235,976

(22) Filed: Sep. 23, 2008

(65) Prior Publication Data

US 2010/0077028 A1     Mar. 25, 2010

(51) Int. Cl.
*G06F 15/16*     (2006.01)
*G06Q 10/10*     (2012.01)

(52) U.S. Cl.
CPC .................................. *G06Q 10/109* (2013.01)

(58) Field of Classification Search
USPC ................................. 709/204; 705/8; 708/112
See application file for complete search history.

(56) References Cited

U.S. PATENT DOCUMENTS

| | | | |
|---|---|---|---|
| 4,034,774 A | | 7/1977 | Clymer et al. |
| 4,073,530 A | | 2/1978 | Seidler |
| 4,073,801 A | | 2/1978 | Moretto et al. |
| 5,033,813 A | | 7/1991 | Westfall |
| 5,262,206 A | | 11/1993 | Rangaswamy et al. |
| 5,960,406 A | * | 9/1999 | Rasansky et al. ................. 705/9 |
| 6,523,012 B1 | | 2/2003 | Glassman |
| 7,827,240 B1 | * | 11/2010 | Atkins ................. G06Q 10/109 709/200 |
| 2003/0018724 A1 | * | 1/2003 | Mathewson et al. .......... 709/206 |
| 2003/0097361 A1 | * | 5/2003 | Huang et al. .................... 707/10 |
| 2004/0204044 A1 | * | 10/2004 | Pinsky et al. .............. 455/556.1 |
| 2005/0114777 A1 | * | 5/2005 | Szeto ............................ 715/710 |
| 2008/0103867 A1 | * | 5/2008 | Moore et al. ....................... 705/9 |
| 2008/0133302 A1 | * | 6/2008 | Brauninger et al. .............. 705/8 |

FOREIGN PATENT DOCUMENTS

| | | |
|---|---|---|
| EP | 01411430 A2 | 4/2004 |
| WO | 0072226 A2 | 11/2000 |

* cited by examiner

*Primary Examiner* — Ranodhi Serrao
(74) *Attorney, Agent, or Firm* — Steven L. Nichols; Fabian VanCott (57) ABSTRACT

A calendar event that is addressed to a plurality of recipients is generated. At least one of the plurality of recipients is designated as a first annotation recipient. A first annotation is associated with the calendar event, the first annotation addressed to the first annotation recipient.

20 Claims, 5 Drawing Sheets

ANNOTATION OF COMMUNICATIONS

BACKGROUND OF THE INVENTION

The present invention relates in general to calendaring systems.

Today, calendaring/scheduling systems are used as a general tool for broad-based collaboration. Such systems have evolved from the traditional one-on-one collaboration paradigm to encompass messaging and meeting scheduling involving many people. For example, a calendaring/scheduling invitation may be for a meeting including several people. The ability to simultaneously communicate with multiple people, based off of a calendaring invitation, provides the advantage of not having to recreate the same message which must be separately addressed and transmitted to each of the desired recipients. However, while it may be convenient to simultaneously communicate with multiple people, such a paradigm generally requires separate, additional communications to conduct related communications with only a portion of the multiple people.

BRIEF SUMMARY OF THE INVENTION

In a first implementation, a method includes generating a calendar event that is addressed to a plurality of calendar event recipients. A designation of a subset of the plurality of calendar event recipients as first annotation recipients is generated. A first annotation is associated with the calendar event, the first annotation being addressed to the first annotation recipients.

In another implementation, a computer program product resides on a computer readable medium having a plurality of instructions stored on it. When executed by a processor, the instructions cause the processor to perform operations including generating a calendar event that is addressed to a plurality of calendar event recipients. The instructions further cause the processor to generate a designation of a subset of the plurality of calendar event recipients as first annotation recipients. A first annotation is associated with the calendar event, the first annotation being addressed to the first annotation recipients.

In yet a further implementation, a computing system includes at least one processor, and at least one memory architecture coupled with the at least one processor. A first software module is executed on the at least one processor and the at least one memory architecture. The first software module is configured to generate a calendar event that is addressed to a plurality of calendar event recipients. A second software module is executed on the at least one processor and the at least one memory architecture. The second software module is configured to generate a designation of a subset of the plurality of calendar event recipients as first annotation recipients. A third software module is also executed on the at least one processor and the at least one memory architecture. The third software module is configured to associate a first annotation with the calendar event, with the first annotation being addressed to the first annotation recipients.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
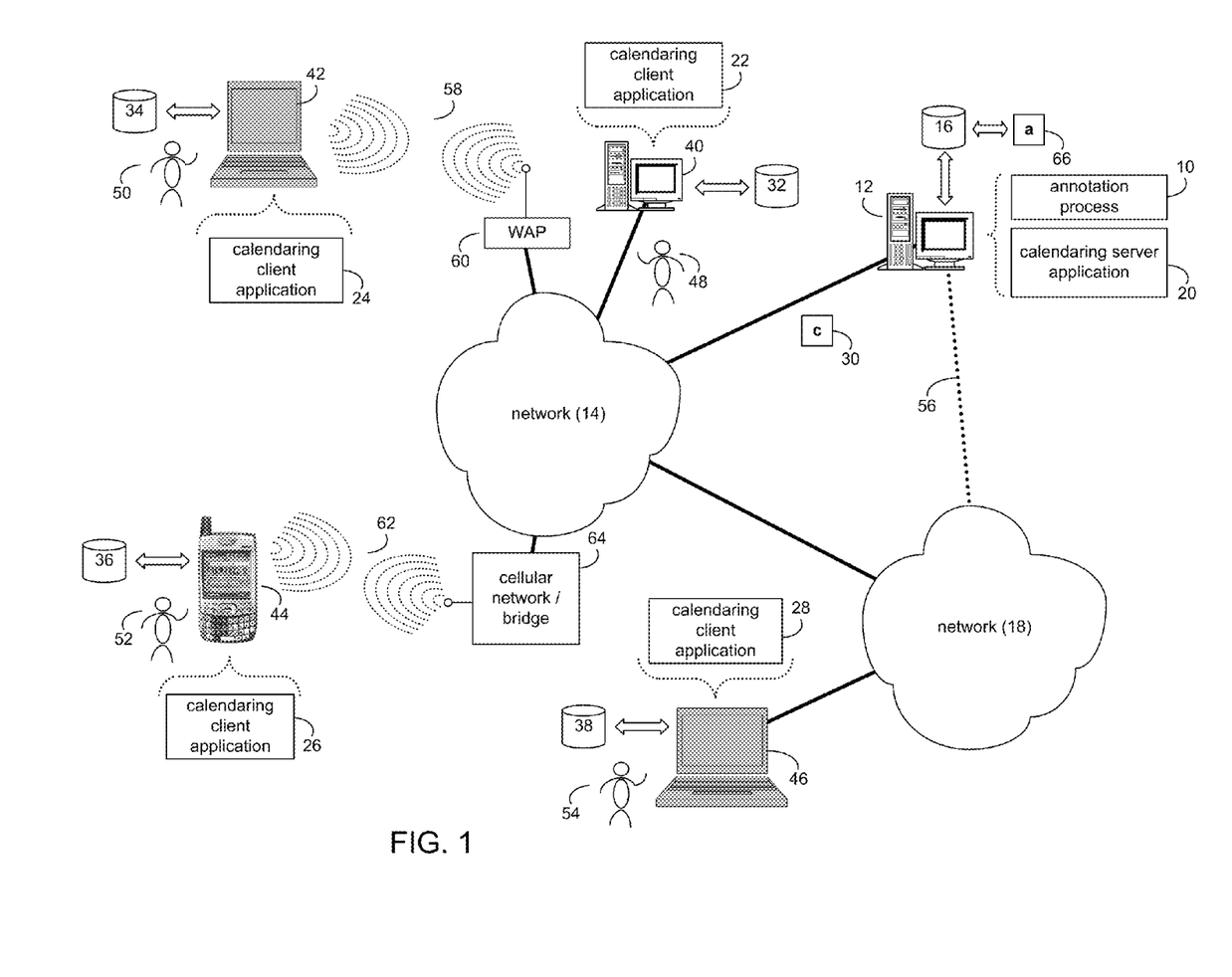
FIG. 1 is a diagrammatic view of an annotation process coupled to a distributed computing network.

Referring to FIG. 1, annotation process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Alternatively, the annotation process may reside on, and be executed by, a client electronic device, such as a personal computer, notebook computer, personal digital assistant, or the like.

As will be discussed below in greater detail, annotation process 10 may generate a calendar event that is addressed to a plurality of calendar event recipients. A designation of a subset of the plurality of calendar event recipients as first annotation recipients may be generated. Annotation process 10 may also associate a first annotation with the calendar event, the first annotation being addressed to the first annotation recipients.

The instruction sets and subroutines of annotation process 10, which may be configured as one or more software modules, and which may be stored on storage device 16 coupled to server computer 12, may be executed by one or more processors (not shown) and one or more memory architectures (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute one or more calendaring/scheduling server applications (e.g., calendaring server application 20), examples of which may include but are not limited to, e.g., Lotus® Domino® Server and Microsoft Exchange Server® (Lotus and Domino are registered trademarks of International Business Machines Corporation in the United States, other countries, or both; and Exchange Server is a registered trademark of Microsoft Corporation in the United States, other countries, or both). Calendaring server application 20 may interact with one or more calendaring/scheduling client applications (e.g., calendaring client applications 22, 24, 26, 28) for creating and managing calendaring/scheduling events (e.g., calendar event 30). Examples of calendaring client applications 22, 24, 26, 28 may include, but are not limited to, e.g., Lotus Notes® and Microsoft Outlook® (Lotus Notes is a registered trademark of International Business Machines Corporation in the United States, other countries, or both; and Outlook is a registered trademark of Microsoft Corporation in the United States, other countries, or both). Annotation process 10 may be a stand-alone application that interfaces with calendaring server application 20 or may be an applet/application that is executed within calendaring server application 20.

The instruction sets and subroutines of calendaring server application 20, which may be configured as one or more software modules, may be stored on storage device 16 (discussed above) coupled to server computer 12, and may be executed by one or more processors (not shown) and one or more memory architectures (not shown) incorporated into server computer 12.

As mentioned above, in addition/as an alternative to being a server-side application residing on server computer 12, the annotation process may be a client-side application (not shown) residing on one or more client electronic devices 40, 42, 44, 46 (e.g., stored on storage devices 32, 34, 36, 38, respectively). As such, the annotation process may be a stand-alone application that interfaces with a calendaring client application (e.g., calendaring client applications 22, 24, 26, 28), or may be an applet/application that is executed within a calendaring client application. As such, the annotation process may be a client-side process, a server-side process, or a hybrid client-side/server-side process, which may be executed, in whole or in part, by server computer 12, or one or more of client electronic devices 40, 42, 44, 46.

The instruction sets and subroutines of calendaring client applications 22, 24, 26, 28, which may be configured as one or more software modules, and which may be stored on storage devices 32, 34, 36, 38 (respectively) coupled to client electronic devices 40, 42, 44, 46 (respectively), may be executed by one or more processors (not shown) and one or more memory architectures (not shown) incorporated into client electronic devices 40, 42, 44, 46 (respectively). Storage devices 32, 34, 36, 38 may include but are not limited to: hard disk drives; solid state drives, tape drives; optical drives; RAID arrays; random access memories (RAM); read-only memories (ROM), compact flash (CF) storage devices, secure digital (SD) storage devices, and memory stick storage devices. Examples of client electronic devices 40, 42, 44, 46 may include, but are not limited to, personal computer 40, laptop computer 42, personal digital assistant 44, notebook computer 46, a data-enabled, cellular telephone (not shown), and a dedicated network device (not shown), for example.

Using calendaring client applications 22, 24, 26, 28, users 48, 50, 52, 54 may create, send, receive, accept, manage, etc., calendaring/scheduling events (e.g., calendar event 30). Sending, receiving, and managing calendar event 30 may include accessing and/or interacting with calendaring server application 20.

Users 48, 50, 52, 54 may access calendaring server application 20 directly through the device on which the calendaring client application (e.g., calendaring client applications 22, 24, 26, 28) is executed, namely client electronic devices 40, 42, 44, 46 for example. Users 48, 50, 52, 54 may access calendaring server application 20 directly through network 14 or through secondary network 18. Further, server computer 12 (i.e., the computer that executes calendaring server application 20) may be connected to network 14 through secondary network 18, as illustrated with phantom link line 56.

The various client electronic devices may be directly or indirectly coupled to network 14 (or network 18). For example, personal computer 40 is shown directly coupled to network 14 via a hardwired network connection. Further, notebook computer 46 is shown directly coupled to network 18 via a hardwired network connection. Laptop computer 42 is shown wirelessly coupled to network 14 via wireless communication channel 58 established between laptop computer 42 and wireless access point (i.e., WAP) 60, which is shown directly coupled to network 14. WAP 60 may be, for example, an IEEE 802.11a, 802.11b, 802.11g, Wi-Fi, and/or Bluetooth device that is capable of establishing wireless communication channel 58 between laptop computer 42 and WAP 60. Personal digital assistant 44 is shown wirelessly coupled to network 14 via wireless communication channel 62 established between personal digital assistant 44 and cellular network/bridge 64, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection. Various additional and/or alternative wired and wireless connections may similarly be employed between the various client electronic devices and networks 14, 18, such as infrared connectivity.

Client electronic devices 40, 42, 44, 46 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

Figure 2:
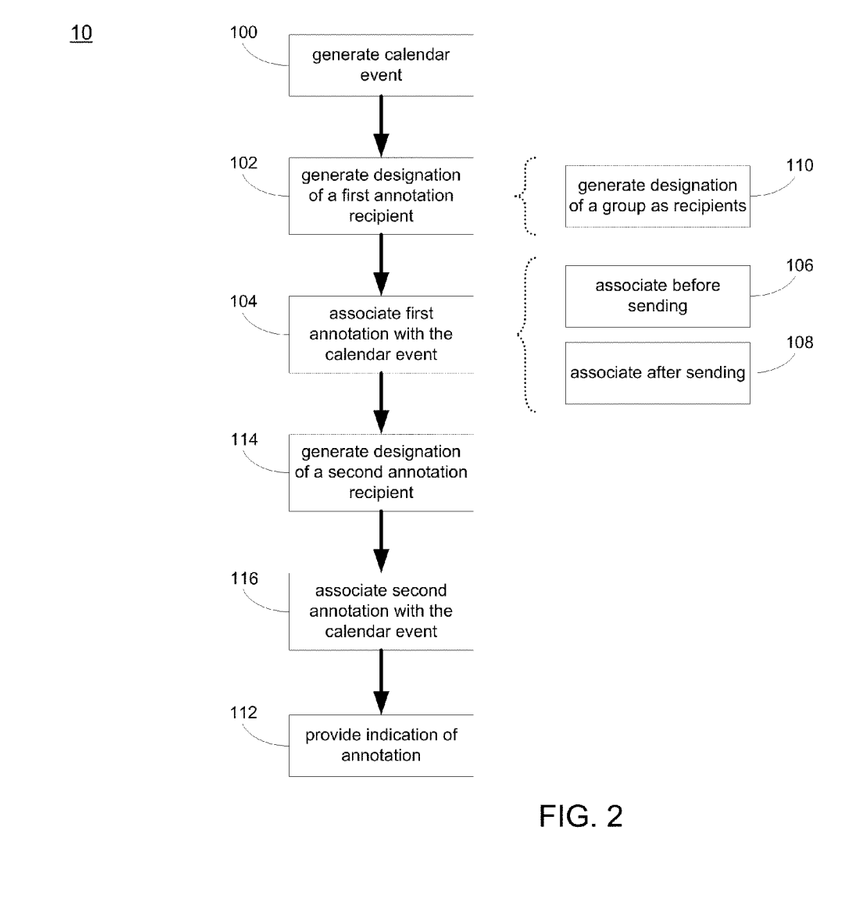
FIG. 2 is a flowchart of the annotation process of FIG. 1.

Referring to FIG. 2, annotation process 10 may generally provide a method that may enable an annotation to be associated with a calendaring event, in which the annotation is provided to only a portion of the invitees of the calendaring event. As will be discussed in greater detail below, the method may generally include generating a calendar event (process block 100) that is addressed to a plurality of recipients. The method may also include generating a designation of a subset of the plurality of recipients as first annotation recipients (process block 102). Also, the method may generally include associating a first annotation with the calendar event, in which the first annotation is addressed to the first annotation recipients (process block 104).

As stated above, in process block 100, the method may include generating a calendar event that is addressed to a plurality of calendar event recipients. The calendar event may include, for example, a meeting, appointment, or other event which may be scheduled for a plurality of recipients, e.g., using a calendaring/scheduling system. Generating the calendar event, in process block 100, may include, for example defining the time and location of the calendar event, as well as defining a plurality of intended invitees for the calendar event. The plurality of intended invitees may be recipients of the calendar event. Generating the calendar event (process block 100) may be performed by a user of a calendaring/scheduling system, wherein the user may generate the calendar event by inputting calendar event attributes (e.g., time, location, and/or intended invitees for the calendar event). Further, the calendar event may be generated, in process block 100, by a client-side application in response to calendar event attributes input by a user. Still further, the calendar event may be generated, in process block 100, by a server-side application in response to calendar event attributes received from a client application, e.g., based upon, at least in part, inputs by a user.

The method may also include generating a designation of a subset of the calendar event recipients as first annotation recipients, in process block 102. For example, either the originator of the calendar event (e.g., the user who may actually schedule the calendar event), or one of the recipients of the calendar event, may wish to include information with the calendar event, or to send a message to a portion of the plurality of recipients of the calendar event. As such, in process block 102, the method may include generating a designation of a subset of the calendar event recipients as first annotation recipients. The first annotation recipients may include a subset of the calendar event recipients, which, as used herein, includes less than all of the calendar event recipients (i.e., the first annotation recipients may only include a portion of the calendar event recipients). Similar to generating the calendar event in process block 100, generating a designation of a subset of the calendar event recipients as first annotation recipients, in process block 102, may be performed by a user, by a client-side application, and/or by a server side-application. For example, in process block 102, a user may generate a designation of a subset of the plurality of calendar event recipients as first annotation recipients, at least in part, by selecting one or more of the calendar event recipients. Further, a client-side application may generate a designation of a subset of the plurality of calendar event recipients as first annotation recipients based upon, at least in part, a selection of one or more of the calendar event recipients made by a user of a calendaring/scheduling system. Still further, generating a designation of a subset of the calendar event recipients as first annotation recipients, in process block 102, may be carried out by a server-side application, in response to, at least in part, a selection received from a client-side application, e.g., based upon, at least in part, a user input.

Generating a designation of the subset of the plurality of calendar event recipients as first annotation recipients, in process block 102, may include, for example, identifying one or more specific calendar event recipients as first annotation recipients. For example, the subset of the calendar event recipients intended to be first annotation recipients may be selected (e.g., via an onscreen pointer controlled by a mouse, or other pointing device). In a related embodiment, generating a designation of the subset of the plurality of calendar event recipients as first annotation recipients, in process block 102, may include generating a designation of a group, in process block 110, which may include a portion of the calendar event recipients, as being the first annotation recipients. For example, often calendaring systems may include an associated contacts list or address book that may include, e.g., names, contact information (e.g., email addresses, telephone numbers, or the like) of individuals within an organization, of frequent contacts of a user, or the like. Often such contacts lists or address books may organized groups of contacts, e.g., which may work in the same department, have the same title, be geographically co-located, etc., as one another.

Additionally/alternatively, rather than being a predefined group of contacts (e.g., which may be contained within a contacts list or address book), the group may be based upon a common attribute of various individuals. Such a common attribute may be, for example, employment by a given company, status as a customer of a given company, membership within an organization (e.g., being within a department of an organization), etc. The common attribute may be ascertainable (e.g., based upon a look up table, such as an LDAP directory) and/or may be assignable by the originator of the annotation. The method may, therefore, allow a designation of the first annotation recipients to be generated, in process block 102, by generating a designation of a group of users as being first annotation recipients, in process block 110.

The method may further include, in process block 104, associating a first annotation with the calendar event, in which the first annotation is addressed to the first annotation recipients, based upon, at least in part, the generated designation of the first annotation recipients, from process block 102. For example, a dialog box, or other similar input field may be provided. The creator of the annotation (which may either be the originator of the calendar event or one of the calendar event recipients) may, for example, type in the desired annotation. As described above, the annotation may be a message to a portion of the calendar event recipients, or other information pertaining to the calendar event or one or more of the recipients of the calendar events. In process block 104, the first annotation (e.g., input via the dialog box or the like) may be associated with the calendar event.

As described above, the annotation may either be created by the originator of the calendar event or by one of the recipients of the calendar event. In an instance in which the annotation is created by the originator of the calendar event, in process block 106 the method may include associating the annotation with the calendar event before the calendar event is sent to the plurality of calendar event recipients. For example, at the time that the calendar event is generated, in process block 100, (i.e., at the time that the time, location, recipients, etc., of the calendar event are specified) the originator of the calendar event may create the first annotation, which, in process block 106, may be associated with the calendar event before the calendar event is sent to the calendar event recipients.

Further, associating the first annotation with the calendar event in process block 104 may include associating (in process block 108) the first annotation with the calendar event after the calendar event has been sent to the calendar event recipients. In such a case, the first annotation may be associated with the calendar event (in process block 108) by either a calendar event recipient (e.g., who would not know of the calendar event before it is sent), or by the originator of the calendar event. Typically, once a calendar event is scheduled (either unilaterally by the originator, or upon acceptance by a calendar event recipient) the calendar event may be displayed in a calendaring/scheduling system, which may include one or more calendaring server applications and/or one or more calendaring client applications. The originator of the calendar event and/or a recipient of the calendar event may select the calendar event via the calendaring/scheduling system, e.g., using an onscreen pointer, or similar mechanism. The creator of the annotation may then create an annotation, which, in process block 108, may be associated with the first calendar event, which has already been sent. Creating and associating the annotation with the calendar event that has already been sent, may be accomplished in a manner similar to that described above.

In process block 112, the method may also include providing an indication of the annotation to the first annotation recipients. The indication of the annotation may include any indicator that may alert the first annotation recipients to the existence of the annotation. The indicator of the first annotation provided to the first annotation recipients may motivate the first annotation recipients to view or otherwise access the first annotation. The indicator of the first annotation may be provided, for example, as an email that may be automatically sent to each of the first annotation recipients. The email may simply be a notice that an annotation has been associated (in process block 104) with the calendar event. Alternatively, the email sent to the first annotation recipients may include the annotation itself. Further, the indication of the annotation may include a graphical or text-based notation that may be visualized along with the calendar event in the calendaring system. In such a case, the indication of the annotation that may be visualized along with the calendar event may only be viewed by the first annotation recipients. As such, the calendar event recipients who are not first annotation recipients may not be aware of the existence of the first annotation.

The method may further allow more than one annotation to be associated with a given calendar event. Any such additional annotations may be created by the creator of the first annotation, or may be created by a different individual. In this regard, the method may include generating a designation of a second subset of the plurality of calendar event recipients as second annotation recipients, in process block 114. The second annotation recipients may be at least partially different than the first annotation recipients. For example, the second annotation recipients may include one or more individuals who where not first annotation recipients. Similarly, the second annotation recipients may not include one or more individuals who where first annotation recipients. Still further, in some instances, the first annotation recipients and the second annotation recipients may not include any common individuals.

In process block 116, the method may allow a second annotation to be associated with the calendar event. Associating the second annotation with the calendar event (in process block 116) may be accomplished in a similar manner as described above with respect to the first annotation. For example, the second annotation may be associated with the calendar event prior to the calendar event being sent to the calendar event recipients. Additionally, the second annotation may be associated with the calendar event after the calendar event has been sent to the calendar event recipients. As described above with reference to the first annotation, an indication of the second annotation may be provided to the second annotation recipients.

For illustrative purposes, the following examples will utilize the system depicted in FIG. 1 and described with reference thereto, as well as to the method described above with reference to FIG. 2. The specific calendaring applications, user interfaces, and the like are intended for illustrative purposes only, and should not be construed as a limitation of the present disclosure, as other implementations may be equally utilized.

Figure 3:
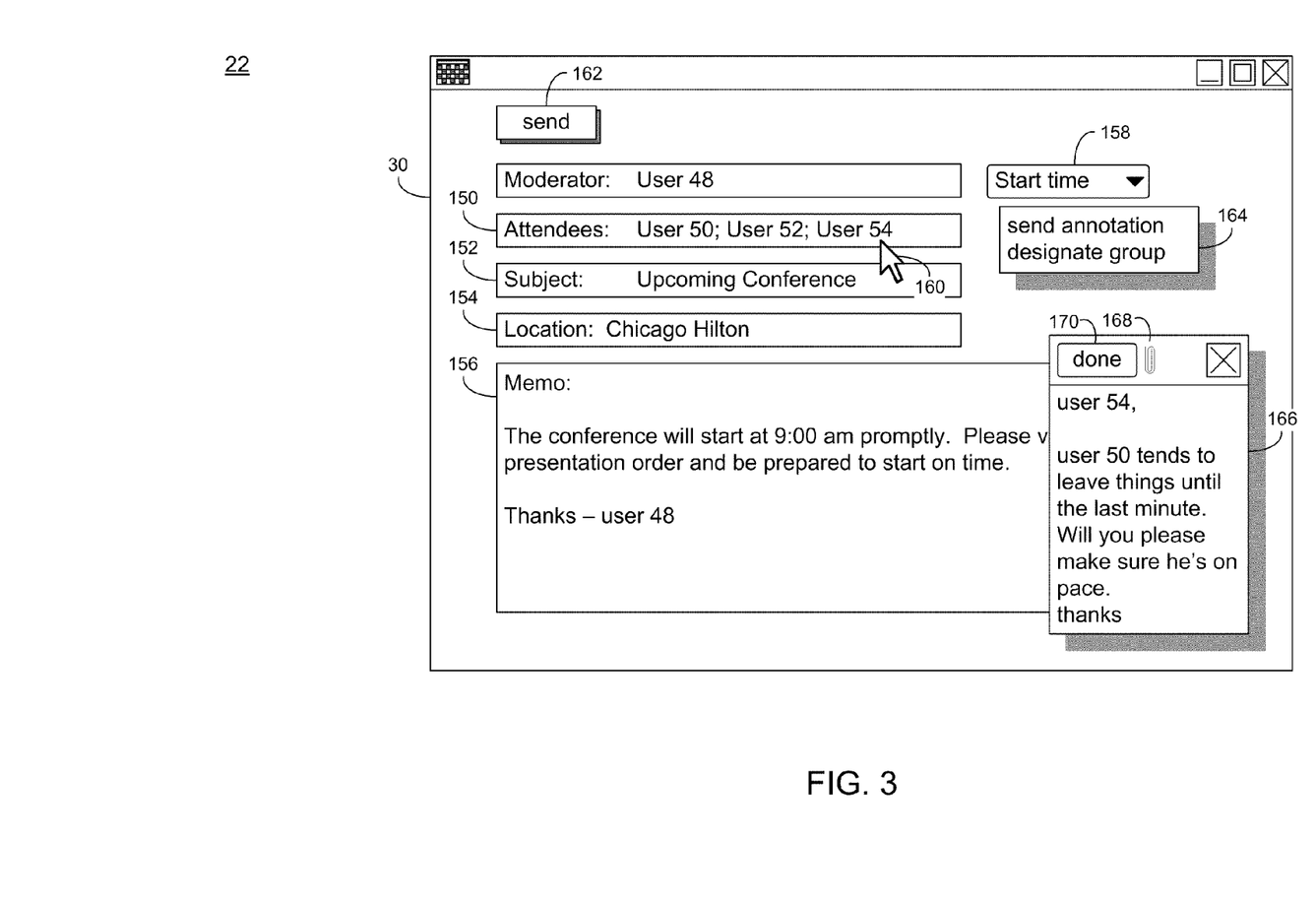
FIG. 3 is a diagrammatic view of a calendar event composed by a user of the annotation process of FIG. 1.

Referring to FIG. 3, a user (e.g., user 48) may schedule a calendar event (e.g., calendar event 30) using calendaring application 22. Annotation process 10 (alone or in conjunction with calendaring client application 22 and/or calendaring server application 20) may allow a calendar event (e.g., calendar event 30) to be generated. For example, user 48 may define various attributes of calendaring event 30 including users 50, 52, 54 as invitees of calendar event 30 (e.g., users 50, 52, 54 may be calendar event recipients). As the originator of calendar event 30, user 48 may appear as the default moderator. User 48 may enter an identifier (e.g., the email address) of users 50, 52, and 54 into "Attendee" field 150, thereby defining users 50, 52, and 54 as calendar event recipients. User 48 may also enter a subject of calendar event 30 (namely "Upcoming Conference") into "Subject" field 152. Similarly, any notations or additional information relating the calendar event 30 may be entered into "Memo" field 156. The start and end times of calendar event 30 may be defined using dropdown menus (e.g., dropdown menu 158), or the like. Once user 48 has defined the various attributes of calendar event 30, user 48 may select, using onscreen pointer 160 (controlled by a pointing device, such as a mouse; not shown) send button 162. Upon selecting send button 162, calendar event 30 may be generated. Further, once send button 162 is selected, an invitation to calendar event 30 may be sent to users 50, 52, 54 via calendaring server application 20.

While user 48 is sending the invitation to calendar event 30 to users 50, 52, 54 including information (e.g., attendees, subject, location, memo) intended for all of the recipients, user 48 may wish to include a message, or information, directed only to user 54, e.g., which may be included as a first annotation to calendar event 30. User 48 may select at least one of the recipients (e.g., user 54) of calendar event 30 to be a first annotation recipient. Selecting at least one of the calendar event recipients (i.e., user 54) to be a first annotation recipient may result in a designation of one the selected calendar event recipient as a first annotation recipient being generated, and may associate the first annotation with calendar event 30. The first annotation associated with calendar event 30 may be addressed to the first annotation recipient (i.e., user 54). The annotation may include, for example, additional text, attached files (e.g., documents, hyperlinks, pictures, and the like).

Consistent with the preceding example, annotation process 10 may allow generating calendar event 30, generating a designation of one or more first annotation recipients (e.g., by selecting one or more of the calendar event recipients as desired first annotation recipients), and associating a first annotation with calendar event 30. As discussed previously, annotation process 10 may be a server-side process (e.g., running on server computer 12), which may interact with and/or be a module of and/or be an applet/application running within, calendaring server application 20. As such, annotation process 10 (alone and/or in conjunction with calendaring server application 20) may receive the information necessary to generate calendar event 30 (e.g., calendar event attributes including the identity of the plurality of calendar event recipients) and to generate a designation of the first annotation recipients (e.g., including the identity of the first annotation recipients). Annotation process 10 (alone and/or in conjunction with calendaring server application 20) may generate calendar event 30 based upon, at least in part, the received information, and may generate a designation of the first annotation recipients, also based upon, at least in part, the received information. Similarly, the annotation process may be a client-side process, e.g., which generate calendar event 30, and generate a designation of the first annotation recipients based upon, at least in part, inputs and/or selections from user 48.

When associating the first annotation, addressed to a first annotation recipients, with calendar event 30, annotation process 10 (alone or in conjunction with calendaring client application 22) may be configured to allow, e.g., user 48, to associate the first annotation with calendar event 30 intended for a first annotation recipient, before sending calendar event 30. Additionally/alternatively, annotation process 10 (alone or in conjunction with calendaring client application 22) may be configured to allow user 48 to associate the first annotation with calendar event 30 after sending calendar event 30, e.g., to users 50, 52, 54.

When annotation process 10 (alone or in conjunction with calendaring client application 22) is configured to allow user 48 to associate the first annotation with calendar event 30 before sending calendar event 30 (e.g., to users 50, 52, 54), user 48 may generate a designation of at least one of the recipients of calendar event 30 (e.g., users 50, 52, 54) as a first annotation recipient by selecting the name of the recipient. For example, user 48 may select, e.g., double-click or right-click, "User 54" within "Attendees" field 150 via onscreen pointer 160. Similarly, user 48 may select more than one user, e.g., by control-clicking the several users, to effect a multiple select, and then right-clicking, as is generally known. In response to selecting "User 54", annotation process 10 (alone or in conjunction with calendaring client application 22) may render option menu 164 that may allow user 48 to generate a designation of user 54 as a first annotation recipient (e.g., by selecting the option "send annotation" from within option menu 164).

In response to selecting "send annotation" from within option menu 164, annotation process 10 (alone or in conjunction with calendaring client application 22) may allow user 48 to generate a designation of only user 54 (or several users selected, e.g., by control-clicking the several users before right-clicking, for example) as a first annotation recipient. Alternatively, user 48 may select "designate group" from within option menu 164, thereby allowing user 48 to generate a designation of a predefined group as first annotation recipients. For example, the predefined group may include a predefined email distribution group (e.g., which may be defined within, and, for example, selected from, a contacts directory associated with calendaring client application 22, or other similar group of users). Annotation process 10 (alone or in conjunction with calendaring client application 22) may allow user 48 to generate a designation of a predefined group as first annotation recipients, and may allow user 48 to send the first annotation to any users of the predefined group who are also included as recipients of calendar event 30. While option menu 164 is shown only including two options (namely "send annotation" and "designate group"), this is intended for illustrative purposes only and should not be construed as a limitation of this disclosure, as the nature and number of options included within option menu 164 may vary according to user need and design criteria.

Continuing with the above-stated example, user 48 may select "send annotation" from within option menu 164, thereby generating a designation of user 54 as a first annotation recipient. Selecting "send annotation" from within option menu 164, may result in annotation process 10 (alone or in conjunction with calendaring client application 22) rendering annotation creation window 166. Annotation process 10 (alone or in conjunction with calendaring client application 22) may allow user 48 to enter a desired message into annotation creation window 166. Additionally, annotation process 10 (alone or in conjunction with calendaring client application 22) may allow user 48 to attach a file as part of the first annotation, e.g., by selecting attachment icon 168 using onscreen pointer 160 and selecting a file to be attached in a manner that may generally correspond to attaching a file to an email message.

In the event that annotation process 10 (alone or in conjunction with calendaring client application 22) is configured to allow first annotation 66 to be associated with calendar event 30 after calendar event 30 has been sent, user 48 may associate first annotation 66 with calendar event 30, e.g., by opening the calendar event (not shown), e.g., which may be displayed on a scheduling calendar accessible via calendaring client application 22. Once open, user 48 may generate a designation of at least one of the plurality of recipients of calendar event 30 as a first annotation recipient. For example, as described above, user 48 may select, e.g., by double-clicking or right-clicking, "User 54" within "Attendees" field 150 of the scheduled calendar event. Selecting "User 54" from within "Attendees" field 150 may result in annotation process 10 (alone or in conjunction with calendaring client application 22) rendering an option menu (similar to option menu 164). Annotation process 10 (alone or in conjunction with calendaring client application 22) may generate a designation of user 54 (or generate a designation of a predefined group) as a first annotation recipient in response to user 48 selecting a corresponding option from within the option menu. Further, annotation process 10 (alone or in conjunction with calendaring client application 22) may render an annotation creation window (similar to annotation creation window 166), in which user 48 may enter a desired annotation.

Once user 48 has completed entering the first annotation into annotation creation window 166, user 48 may select done button 170, and may send calendar event 30, e.g., by selecting send button 160. Selecting send button 160 may result in generated calendar event 30 being sent to the defined recipients (e.g., user 50, user 52, user 54), e.g., via calendaring server application 20. Annotation process 10 may associate the first annotation with calendar event 30. For example, the first annotation (e.g., first annotation 66) may be stored on storage device 16 coupled to server computer 12. Additionally, a reference to first annotation 66 may be recorded with respect to calendar event 30 by calendaring server application 20.

Continuing with the above-stated example, once first annotation 66 has been associated with calendar event 30, annotation process 10 (alone or in conjunction with one or more of calendaring server application 20 and calendaring client application 28) may provide an indication of first annotation 66, which may be received by user 54. For example, and referring also to FIG. 4, in a case in which first annotation 66 was associated with calendar event 30 before calendar event 30 was sent, when user 54 opens calendar event 30, via calendaring client application 28, calendar event 30 may include an indicator (e.g., icon 200) that an annotation is associated with calendar event 30. User 54 may select, via onscreen pointer 160, icon 200 resulting in annotation process 10 (alone or in conjunction with calendaring client application 28 and/or calendaring server application 20) rendering annotation display window 202, e.g., which may include the text entered by user 48, an attached file, or the like. Selecting icon 200 may result in an AJAX call being made to server computer 12 (i.e., the computer upon which first annotation 66 may be stored), to retrieve and display first annotation 66 (e.g., in annotation display window 202). In addition/as an alternative to an AJAX call being made to server computer 12, annotations may be retrieved via web services, CORBA, DCOM, or the like, as will be understood by those having skill in the art.

Figure 4:
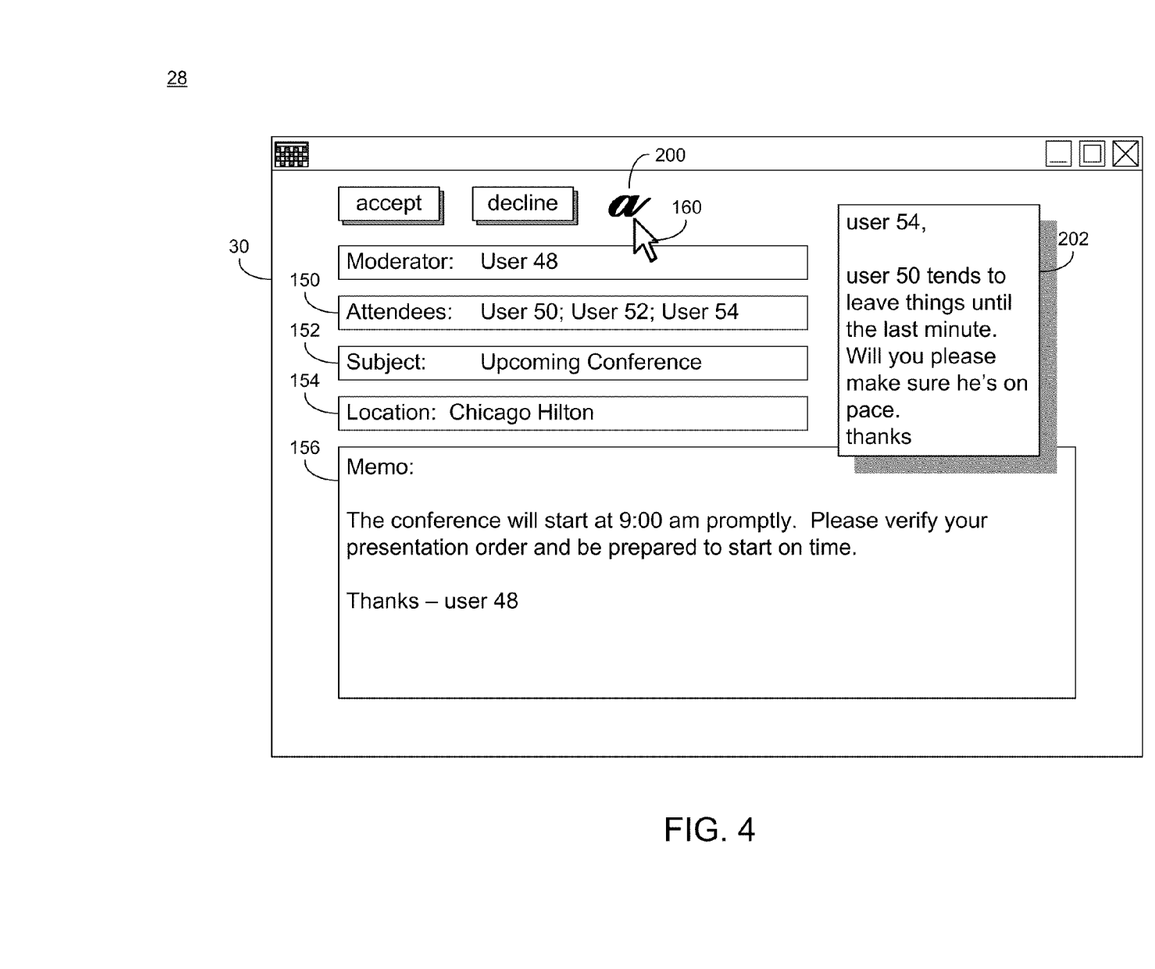
FIG. 4 is a diagrammatic view of a calendar event as received by a user of the annotation process of FIG. 1.

In a case in which annotation 66 was associated with calendar event 30 after calendar event 30 has already been sent, an indicator of first annotation 66 that only surfaces when calendar event 30 is opened by user 54 may be less valuable. For example, user 54 may only realize that first annotation 66 has been associated with calendar event 30 if user 54 opens calendar event 30. However, after initially receiving and accepting an invitation to calendar event 30, user 54 may not later open calendar event 30, and may not, therefore, become aware that an annotation has been associated with calendar event 30. Accordingly, an annotation process 10 may provide an indication of first annotation that may alert user 54 that an annotation has been newly associated with a previously received calendar event. For example, annotation process 10 (alone or in conjunction with calendaring client application 28) may provide an indicator of first annotation 66 by rendering calendar event 30, via calendaring client application 28, as a new/unaccepted calendar event/invitation (e.g., motivating user 54 to re-open calendar event 30, thus alerting user 54 to the newly associated first annotation 66). Various additional/alternative indications of first annotation 66 may be provided.

In addition to first annotation 66, annotation process 10 (alone or in conjunction with calendaring client application 22) may allow a second annotation (not shown) to be associated with calendar event 30. For example, in a similar manner as described with respect to first annotation 66, annotation process 10 (alone or in conjunction with calendaring client application 22) may allow user 48 to select (e.g., via option menu 164) at least one of the recipients of calendar event 30 (i.e., user 50, 52, 54) as a second annotation recipient, and may generate a designation of the selected calendar event recipients as second annotation recipients. The second annotation recipient may be different from the first annotation recipient (i.e., may be someone other than user 54). Further, annotation process 10 (alone or in conjunction with calendaring client application 22) may create a second annotation (e.g., via annotation creation window 166). Annotation process 10 may associate the second annotation with calendar event 30. Once the second annotation has been associated with calendar event 30, annotation process 10 may provide an indication of the second annotation to the second annotation recipients, as described above.

In addition to an annotation created by the originator of the calendar event, one or more of the recipients of the calendar event may create an annotation that may be associated with the calendar event after the calendar event has been sent. Continuing with the above-stated example of calendar event 30, and referring also to FIG. 5, user 52 may be an attendee of the meeting represented by scheduled calendar event 30. Annotation process 10 (alone or in conjunction with calendaring client application 26) may allow user 52 to generate a designation of one or more recipients of calendar event 30

Figure 5:
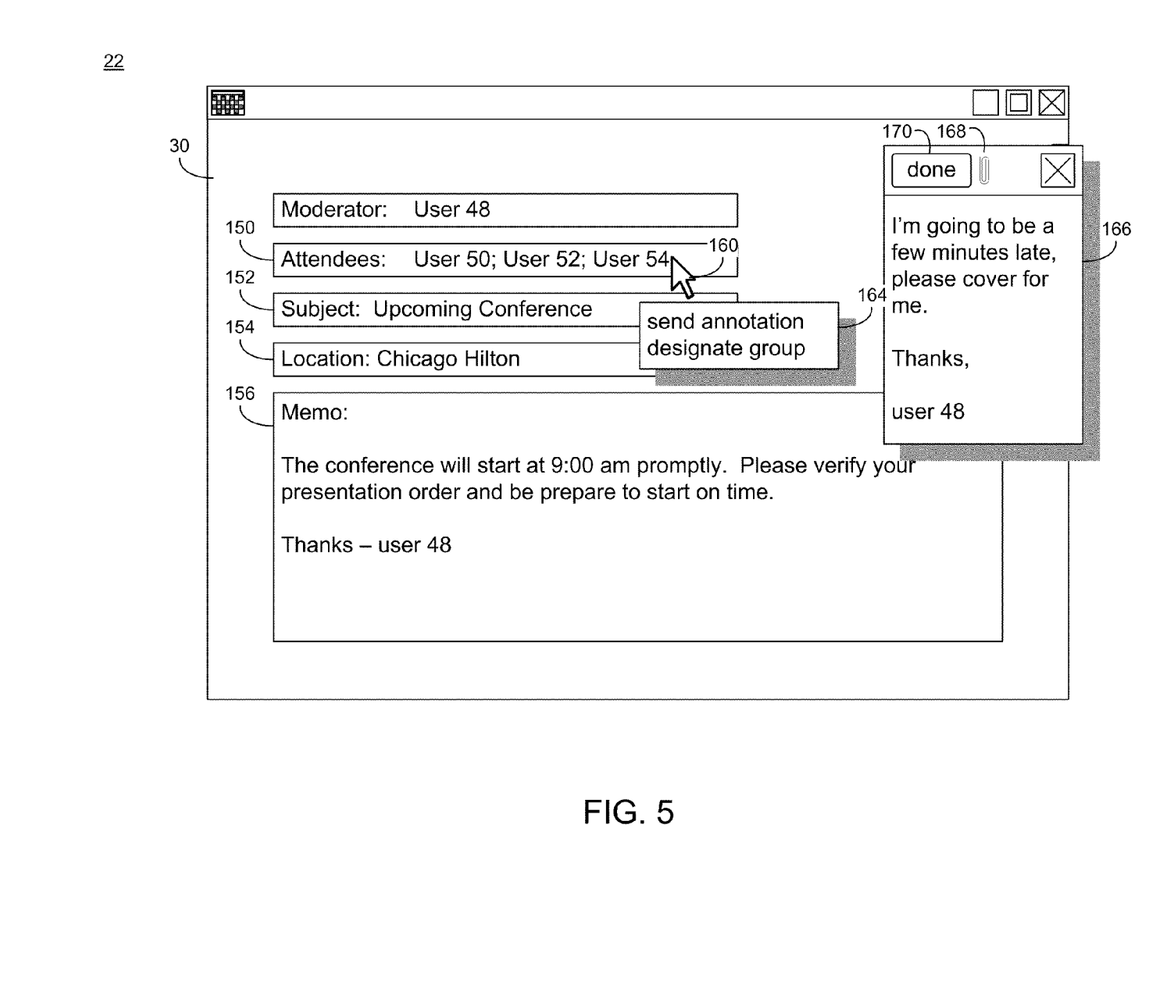
FIG. 5 is a diagrammatic view of a calendar event received by a user of the annotation process of FIG. 1.

(e.g., moderator user 48, and attendees user 50, user 52, and user 54) as a first annotation recipient. For example, user 52 may use onscreen pointer 160 to select, e.g., by double-clicking or right-clicking, user 54 resulting in annotation process 10 (alone, or in conjunction with calendaring client application 26) rendering option menu 164. As discussed above, user 52 may select a desired option from option menu 164. Selecting a desired option from option menu 164 may result in annotation process 10 generating a designation of user 54 (or several users if multiple recipients of calendar event 30 have been selected, e.g., via control-clicking several recipients) as a first annotation recipient (e.g., if "send annotation" is selected), or to generating a designation of a predefined group as a first annotation recipient (e.g., if "designate group" is selected), as described previously.

Continuing with the above-stated example, in which user 52 may wish to send an annotation to user 54, user 52 may select "send annotation" from within option menu 164. Similar to the previously described example, selecting "send annotation" form within option menu 164 may result in annotation process 10 (alone or in conjunction with calendaring client application 26) rendering annotation creation window 166. User 52 may enter a desired message into annotation creation window 166, and may attach any desired files, e.g., by selecting, via onscreen pointer 160, attachment icon 168. Once user 52 has entered the desired message, and attached any desired attachments, user 52 may select done button 170, thereby causing annotation process 10 (alone or in conjunction with one or more of calendaring client application 26 and calendaring server application 20) to associate the annotation with calendar event 30, in which the annotation is addressed to the first annotation recipient (i.e., user 54).

In a similar manner as described above, annotation process 10 (alone or in conjunction with one or more of calendaring server application 20 and calendaring client application 28) may provide an indication of the annotation to user 54. For example, since calendar event 30 has already been scheduled, user 54 may not access the scheduled calendar event again, e.g., absent any need on user 54's part to check any details of the upcoming meeting. As such, providing an indication of the annotation may include, for example, causing the scheduled calendar event to resurface as an unread/unopened event or invitation, thereby motivating user 54 to view the scheduled calendar event. Upon viewing the scheduled calendar event (i.e., calendar event 30), user 54 may access the annotation in a similar manner as discussed above. While providing an indication of the annotation has been described as causing the calendar event to resurface as an unread/unopened event or invitation, various additional/alternative visual and/or audible indicators may be equally utilized.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:

with a computer, generating a calendar event that is electronically addressed to a plurality of calendar event recipients via a computer network, said calendar event being an event scheduled to occur at a future time for a plurality of participants and recorded in an electronic calendar in a calendaring application executing on said computer, said calendar event recipients receiving an electronic notification of said calendar event via said computer network;

with said computer, generating a designation of a subset of the plurality of calendar event recipients as first annotation recipients, such that, with respect to the calendar event, there are both general event recipients and first annotation recipients; and with said computer, associating a first annotation with the calendar event, the first annotation comprising information additional to the calendar event as originally created, the first annotation being addressed to the first annotation recipients such that, with respect to the calendar event, all recipients are sent the electronic notification, but the first annotation is sent only to the designated subset of recipients for that calendar event.

2. The method of claim 1, wherein generating a designation of the subset of the plurality of calendar event recipients as first annotation recipients comprises generating a designation of a predefined group as the first annotation recipients.

3. The method of claim 1, wherein associating the first annotation with the calendar event comprises associating the first annotation with the calendar event before the calendar event is sent to the plurality of calendar event recipients.

4. The method of claim 1, wherein associating the first annotation with the calendar event comprises associating the first annotation with the calendar event after the calendar event is sent to the plurality of calendar event recipients.

5. The method of claim 1, further comprising providing an indication of the first annotation to the first annotation recipients.

6. The method of claim 1, further comprising:
generating a designation of a second subset of the plurality of calendar event recipients as second annotation recipients; and
associating a second annotation with the calendar event, the second annotation addressed to the second annotation recipients.

7. The method of claim 6, further comprising providing an indication of the second annotation to the second annotation recipients.

8. A computer program product residing on a non-transitory computer readable storage medium having a plurality of instructions stored thereon, which, when executed by a processor, cause the processor to perform operations comprising:
generating a specific calendar event that is addressed to a plurality of calendar event recipients, said calendar event being an event scheduled to occur at a future time for a plurality of participants and recorded in an electronic calendar in a calendaring application, said calendar event recipients receiving an electronic notification of said calendar event via a computer network;
generating a designation of a subset of the plurality of calendar event recipients as first annotation recipients, such that, with respect to the specific calendar event, there are both general event recipients and first annotation recipients; and
associating a first annotation with the calendar event, the first annotation comprising information additional to the calendar event as originally created and being addressed to the first annotation recipients, such that, with respect to the specific calendar event, all recipients are sent the electronic notification, but the first annotation is sent only to the designated subset of recipients for that calendar event.

9. The computer program product of claim 8, wherein the instructions for generating a designation of the subset of the plurality of calendar event recipients as first annotation recipients comprise instructions for generating a designation of a predefined group as the first annotation recipients.

10. The computer program product of claim 8, wherein the instructions for associating the first annotation with the calendar event comprise instructions for associating the first annotation with the calendar event before the calendar event is sent to the plurality of calendar event recipients.

11. The computer program product of claim 8, wherein the instructions for associating the first annotation with the calendar event comprise instructions for associating the first annotation with the calendar event after the calendar event is sent to the plurality of calendar event recipients.

12. The computer program product of claim 8, further comprising instructions for providing an indication of the first annotation to the first annotation recipients.

13. The computer program product of claim 8, further comprising instructions for:
generating a designation of a second subset of the plurality of calendar event recipients as second annotation recipients; and
associating a second annotation with the calendar event, the second annotation addressed to the second annotation recipients.

14. The computer program product of claim 8, wherein said subset of calendar event recipients is designated based on at least one common attribute that is common to the recipients designated to the subset.

15. A computing system comprising:
at least one processor;
at least one memory architecture coupled with the at least one processor;
a first software module executed on the at least one processor and the at least one memory architecture, wherein the first software module is configured to generate a calendar event that is addressed to a plurality of calendar event recipients, said calendar event being an event scheduled to occur at a future time for a plurality of participants that is recorded in an electronic calendar in a calendaring application, said calendar event recipients receiving an electronic notification of said calendar event via a computer network;
a second software module executed on the at least one processor and the at least one memory architecture, wherein the second software module is configured to generate a designation of a subset of the plurality of calendar event recipients as first annotation recipients such that, with respect to the specific calendar event, there are both general event recipients and first annotation recipients; and
a third software module executed on the at least one processor and the at least one memory architecture, wherein the third software module is configured to associate a first annotation with the calendar event, the first annotation comprising information additional to the calendar event as originally created and being addressed to the first annotation recipients, the first annotation addressed to the first annotation recipients such that, with respect to the specific calendar event, all recipients are sent the electronic notification, but the first annotation is sent only to the designated subset of recipients for that calendar event.

16. The computing system of claim 15, wherein the second software module, configured to generate a designation of the subset of the plurality of calendar event recipients as first annotation recipients, is configured to generate a designation of a predefined group as the first annotation recipients.

17. The computing system of claim 15, wherein the third software module, configured to associate the first annotation with the calendar event, is configured to associate the first annotation with the calendar event before the calendar event is sent to the plurality of calendar event recipients.

18. The computing system of claim 15, wherein the third software module, configured to associate the first annotation with the calendar event, is configured to associate the first annotation with the calendar event after the calendar event is sent to the plurality of calendar event recipients.

19. The computing system of claim 15, further comprising a fourth software module executed on the at least one processor and the at least one memory architecture, wherein the fourth software module is configured to provide an indication of the first annotation to the first annotation recipients.

20. The computing system of claim 15, further comprising:
- a fifth software module executed on the at least one processor and the at least one memory architecture, wherein the fifth software module is configured to generate a designation of a second subset of the plurality of calendar event recipients as second annotation recipients; and
- a sixth software module executed on the at least one processor and the at least one memory architecture, wherein the sixth software module is configured to associate a second annotation with the calendar event, the second annotation addressed to the second annotation recipients.

* * * * *